United States Patent
Matsuo

(10) Patent No.: US 7,171,127 B2
(45) Date of Patent: Jan. 30, 2007

(54) OPTICAL TRANSMISSION CONTROLLER

(75) Inventor: Toshihisa Matsuo, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 640 days.

(21) Appl. No.: 10/717,283

(22) Filed: Nov. 18, 2003

(65) Prior Publication Data

US 2004/0109696 A1    Jun. 10, 2004

(30) Foreign Application Priority Data

Nov. 18, 2002    (JP)    ............................. 2002-334234

(51) Int. Cl.
*H04B 10/04*    (2006.01)
*H04B 10/12*    (2006.01)
*H04B 10/00*    (2006.01)
*H01S 3/13*    (2006.01)
*H01S 3/00*    (2006.01)

(52) U.S. Cl. .................... 398/195; 398/93; 398/198; 398/192; 398/147; 398/158; 398/159; 372/38.01; 372/29.011; 372/29.015; 372/29.016; 372/38.02; 372/38.07

(58) Field of Classification Search ........ 398/192–201; 372/29.015, 38.01, 38.07, 29.016, 38.08, 372/29.011
See application file for complete search history.

(56) References Cited

U.S. PATENT DOCUMENTS

| | | | | |
|---|---|---|---|---|
| 5,214,666 A | * | 5/1993 | Watanabe et al. ............. 372/69 |
| 5,253,267 A | * | 10/1993 | Johnson .................... 372/38.01 |
| 5,371,755 A | * | 12/1994 | Murata et al. ............ 372/38.02 |
| 5,475,699 A | * | 12/1995 | Sakiyama et al. ........ 372/43.01 |
| 5,513,030 A | * | 4/1996 | Epworth ..................... 398/198 |
| 5,526,164 A | * | 6/1996 | Link et al. .................. 398/195 |
| 5,778,017 A | * | 7/1998 | Sato et al. ............... 372/38.02 |
| 6,044,097 A | * | 3/2000 | Kawamura et al. ...... 372/38.01 |
| 6,370,175 B1 | * | 4/2002 | Ikeda et al. ................ 372/38.1 |
| 6,480,314 B1 | * | 11/2002 | Kobayashi .................. 398/192 |
| 6,496,525 B1 | * | 12/2002 | Kimura .................. 372/38.02 |
| 6,822,987 B2 | * | 11/2004 | Diaz et al. ............... 372/38.02 |
| 2003/0007525 A1 | * | 1/2003 | Chen ........................... 372/31 |

FOREIGN PATENT DOCUMENTS

JP    05-327617    12/1993

\* cited by examiner

*Primary Examiner*—Kenneth Vanderpuye
*Assistant Examiner*—Thi Q. Le
(74) *Attorney, Agent, or Firm*—David G. Conlin; David A. Tucker; Edwards Angell Palmer & Dodge LLP

(57) ABSTRACT

An optical transmission controller includes a semiconductor-laser, a semiconductor laser driver, a monitor photoreceptor, a waveform detector and a phase relation adjuster. The semiconductor laser driver allows the semiconductor laser to output an optical signal. The monitor photoreceptor monitors the optical signal output. The waveform detector detects a fall state of the optical signal output. The phase relation adjuster adjusts a phase relation between a fall timing of an input current and a variation timing of a relaxation oscillation of the optical signal output in accordance with a detection result of the waveform detector.

8 Claims, 10 Drawing Sheets

OPTICAL TRANSMISSION CONTROLLER

CROSS-REFERENCE TO RELATED APPLICATION

This application is related to Japanese application No. 2002-334234 filed on Nov. 18, 2002, whose priority is claimed under 35 USC §119, the disclosure of which is incorporated by reference in its entirety.

BACKGROUND OF THE INVENTION

1. Field of the Invention

The present invention relates to an optical transmission controller. More particularly, the present invention relates to an optical transmission controller which has application in the field of optical communications and which employs a semiconductor laser as a light source for optical signal transmission.

2. Description of the Related Art

With increase in information volume and communication speed, optical communications are finding increased use as a means for transmission of information. They are currently used mainly in trunk line systems, but are predicted to have application in apparatus-to-apparatus communications and in networked systems in correspondence with the computerization in offices and households as they are expected to be in widespread use. For the optical communications, there are used optical fibers as a communication medium and transmit/receive apparatuses for transmitting/receiving light.

In the field of communications, there is a strong demand for improvement in communication speed for obtainment of more information in a shorter time, and this also holds in the field of optical communications. The improvement in optical communication speed requires inexpensive light sources that enable high-speed optical modulation. In recent years, a semiconductor laser that enables direct modulation at a speed of about several hundreds of Mbps to 1 Gbps has been often used to meet this requirement. Though in trunk line systems and the like that require a higher modulation speed, external modulators are employed for modulating laser beams, such modulators are not suitable for consumer use because of their complicated construction and expensiveness. Further, there is a common perception that a communication speed as high as 1 Gbps is sufficient for consumer use with the current state of art.

It is desired that plastic fibers be used since they are inexpensive as a medium and excellent in their connectivity to apparatuses for a low-cost construction of optical communication systems. The use of plastic fibers is advantageous in that a red semiconductor laser (operated with λ in the vicinity of 650 nm) is available as an inexpensive light source in the use of plastic fibers since recent years have seen a remarkable proliferation of the red semiconductor laser for use as a DVD device laser.

With regard to the drive of a semiconductor laser through direct modulation, it does not pose any particular difficulty when the modulation speed is about 100 Mbps or lower, while when the modulation speed is several hundreds of Mbps or higher, it presents the following challenges to be solved:

(1) Ensuring the quality of a modulation input signal supplied to a driving circuit for driving a semiconductor laser.

(2) Increasing driving-circuit operation speed.

(3) Contriving circuits and wirings existing between the semiconductor laser and the driving circuit.

Conventional measures to solve the above challenges include:

(1) Adopting a high-speed interface of small amplitude such as one in a PECL (Positive Emitter Coupled Logic) or a LVDS (Low Voltage Differential Signaling) for input to the driving circuit.

(2) Integrating driving circuits and adopting processes for manufacturing a semiconductor laser that is suitable for high-speed operation such as a BiCMOS or a compound semiconductor laser.

(3) Minimizing inductance components that block high-speed transmittance of the signal by matching impedances between the semiconductor laser and the driving circuit and by using wirings that have the shortest possible length.

For example, with regard to the above challenge in item (3), a technique is known about high-speed drive of a semiconductor laser (see, for example, Japanese Unexamined Patent Publication No. Hei 5(1993)-327617).

In conventional methods of driving a semiconductor laser, an oscillation threshold current is constantly provided as a bias current to a semiconductor laser and a modulation current is superposed on the oscillation threshold current for generating modulation light. In recent years, however, there is a demand, with increase in communication speed, for reduction in power consumption of apparatuses. One measure to meet the demand is considered to be to reduce the bias current in driving the semiconductor laser.

The reduction of the bias current is achieved as follows. When the semiconductor laser is driven starting with a bias current not higher than the oscillation threshold value, an oscillation delay occurs in the laser. It is assumed, however, that this raises no problem as long as systems are used in a range permitted by the specifications of the systems or as long as the semiconductor laser is driven so as to compensate the delay in pulse width.

What is specifically problematic when the semiconductor laser is driven starting with a bias current not higher than the oscillation threshold value is that a significant relaxation oscillation occurs in an optical signal output (hereafter, also referred to simply as "an optical output"). In such a case, when a modulation signal frequency is high, a modulation is effected before the relaxation oscillation does not subside yet. At this time, a fall state of a waveform of the optical output (a fall portion of a waveform of the optical output) is subject to the relaxation oscillation.

The relaxation oscillation of the optical output will be briefed with reference to FIG. 5 (see: solid line waveforms in FIG. 5). When a bias current Ib not higher than the oscillation threshold voltage is fed to the semiconductor laser and is raised to a value I at the time t=t0, an injection electron density (injection carrier density) n in the semiconductor laser increases starting with a value nb assumed when the bias current Ib is started to be fed, with a time constant $\tau_n$ (=lifetime of electron) in accordance with an exponential function. When the injection electron density n reaches a threshold electron density nth upon the lapse of a time td, the optical output from the laser is started and a photon density nph rapidly increases.

Thereafter, the injection electron density n continues to increase beyond the threshold electron density nth, and then turns to decrease with increase in the photon density nph (with increase in light emission). When the injection electron density n decreases to the threshold electron density nth, the photon density nph turns to decrease. Then, the photon density nph becomes sufficiently small when the injection electron density n, which once has decreased to a value not higher than the threshold electron density nth, again turns to increase to reach the threshold electron density nth. The above motion is repeated several times before a steady state is attained. This transient phenomenon is called relaxation oscillation. A frequency fr of this relaxation oscillation is said to be normally several hundreds of MHz to several GHz and is represented approximately by the formula (i):

$$fr=1/(2\pi) \times (1/(\tau n \tau ph))^{1/2} \times ((I-Ith)/Ith)^{1/2} \qquad (i),$$

wherein τ ph is the lifetime of a photon in a resonator.

Next, the time to switch off the input current (input signal) will be examined. In the case where the input current is switched off after the termination of the relaxation oscillation, the fall portion of the waveform of the optical output is not subject to the relaxation oscillation. In the case where the input current is switched off during the relaxation oscillation, however, the fall portion of the optical output waveform is subject to the relaxation oscillation. Referring to FIG. 5, the input current is switched off at times t1, t2, t3 and t4. The times t1, t2, t3 and t4 are four typical times in one variation period of the injection electron density n (one period of the relaxation oscillation). The time t1 is where the injection electron density n turns from increase to decrease, the time t2 is where the injection electron density n is on the decrease at the threshold electron density nth, the time t3 is where the injection electron density n turns from decrease to increase, and the time t4 is where the injection electron density n is on the increase at the threshold electron density nth.

Indicated by waveforms ① to ④ of FIG. 5 are ones obtained by switching off the input current (input signal) at the times t1, t2, t3 and t4, respectively. As seen, the fall state of the waveform of the injection electron density n (optical output waveform) varies depending on when the input current is switched off. The waveforms ③ and ④ compared to the waveforms ① and ② increase the injection electron density n even after the input current is switched off so that light is emitted with the injection electron density n above the threshold electron density nth. In other words, the waveforms ③ and ④ have further oscillation crests after the input current is switched off. This serves to deteriorate the fall state of the waveform of the optical output and to prolong a fall time thereof. With such optical waveforms, an Eye Opening cannot be ensured in waveforms obtained during communication, and thereby the communication quality is significantly deteriorated. Further, lowering the communication speed becomes necessary for ensuring the communication quality.

As understood from the above, when the semiconductor laser is high-speed driven starting with a value not higher than the oscillation threshold value, the fall portion of the optical output waveform is subject to the relaxation oscillation depending on when the input signal is switched off, and thereby the communication quality is deteriorated and the high-speed communication is impaired.

This problem cannot be coped with by the above mentioned conventional measures.

SUMMARY OF THE INVENTION

The present invention has been made in view of the above circumstances and the purpose thereof is to improve a waveform of a fall portion of an optical output when a high-speed drive of a semiconductor laser is performed starting with a value not higher than an oscillation threshold value for its low power drive by appropriately selecting the switching-off timing of an input current with respect to a relaxation oscillation of the optical output.

The present invention provides an optical transmission controller comprising: a semiconductor laser; a semiconductor laser drive section for allowing the semiconductor laser to output an optical signal; a monitor photoreceptor for monitoring the optical signal output from the semiconductor laser; a waveform detection means for detecting a fall state of a waveform of the optical signal output monitored by the monitor photoreceptor; and a phase relation adjustment means for adjusting a phase relation between a fall timing of an input current fed to the semiconductor laser and a variation timing of a relaxation oscillation of the waveform of the optical signal output in accordance with a detection result of the waveform detection means to reduce a relaxation oscillation of a fall portion of the waveform of the optical signal output.

According to the present invention, the phase relation between the fall timing of the input current fed to the semiconductor laser and the variation timing of the relaxation oscillation of the waveform of the optical signal output is adjusted to reduce the relaxation oscillation of the fall portion of the waveform of the optical signal output. This allows a flat waveform of the optical signal output to be obtained which is free from a transient oscillation otherwise occurring at the fall portion, thereby preventing deterioration in quality of communication that uses the optical signal.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
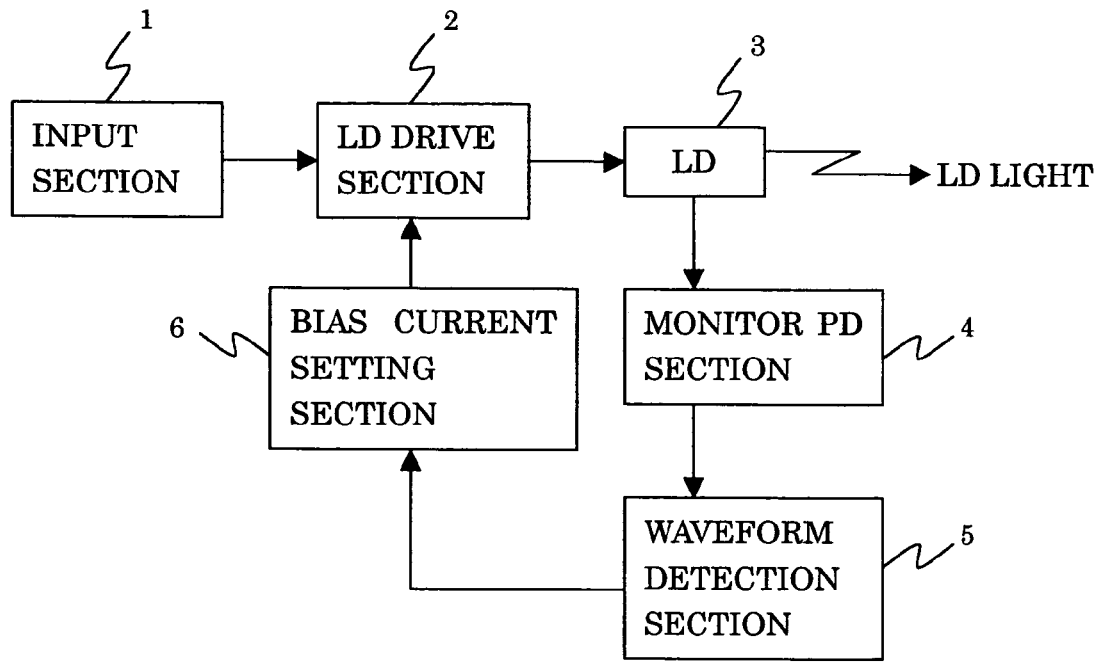
FIG. 1 is an explanatory view illustrating a construction of Embodiment 1 of the present invention.

The present invention improves a fall portion of an optical output when a high-speed drive of a semiconductor laser is performed starting with a value not higher than an oscillation threshold value for its low power drive by appropriately selecting the switching-off timing of an input current with respect to a relaxation oscillation of the optical output.

The phase relation adjustment means includes the following three means:

(1) A Bias Current Setting Means

A bias current setting means is for adjusting the bias current of the semiconductor laser within a range between values smaller than an oscillation threshold value to vary a delay time in the optical signal output against the input current to vary a phase of the relaxation oscillation of the waveform of the optical signal output with respect to the fall timing of the input current.

In other words, the bias current setting means is for varying a rise timing of the input current (delay time in the optical signal output) with respect to a switching-on timing of the input signal (input current) to vary the phase of the relaxation oscillation of the waveform of the optical signal output with respect to a switching-off timing of the input signal. By varying the bias current by the bias current setting means, the time for an injection electron density to reach its threshold value is varied, and thereby the phase of the relaxation oscillation of the output waveform of the optical signal is varied with respect to the switching-off timing of the input signal.

An appropriate period which the variation in the delay time in the optical signal output against the input current is caused by adjusting the bias current is not longer than one period of the relaxation oscillation of the optical signal output.

(2) A Bias Current Setting Means

A bias current setting means is for adjusting the input current to vary a frequency of the relaxation oscillation of the waveform of the optical signal output and thereby to vary the phase of the relaxation oscillation of the waveform of the optical signal output with respect to the fall timing of the input current.

In other words, the bias current setting means is for varying the frequency of the relaxation oscillation of the output waveform of the optical signal to vary the phase of the relaxation oscillation with respect to the switching-off timing of the input current. As seen from the formula (i), the frequency of the relaxation oscillation becomes higher with a larger value I of the modulation current (input current). By varying the modulation current by the bias current setting means, the frequency of the relaxation oscillation is varied, and thereby the phase of the relaxation oscillation of the output waveform of the optical signal is varied with respect to the switching-off timing of the input signal.

(3) An Input Signal Control Means

An input signal control means is for adjusting the switching-off timing of the input signal to vary the phase of the relaxation oscillation of the waveform of the optical signal output with respect to the fall timing of the input current.

In other words, the input signal control means is for varying the switching-off timing of the input signal with respect to the relaxation oscillation of the waveform of the optical signal output to vary the phase of the switching-off timing of the input signal with respect to the relaxation oscillation.

The present invention will now be explained in detail based on the preferred embodiments shown in the drawings. It should be understood that the present invention is not limited to the embodiments and that various modifications are possible.

Embodiment 1 will be explained with reference to FIG. 1. In this embodiment, a bias current setting means is employed as a phase relation adjustment means.

An input section 1 is an I/F (interface) section across which an optical transmission signal is exchanged in, for example, a PECL or a LVDS. From the input section 1, a signal is output which is compliant in level (voltage or current) with a semiconductor laser diode drive section 2, and input to the semiconductor laser diode drive section 2. (The word "a semiconductor laser diode" is hereafter referred to as "an LD".) The LD drive section 2 is a circuit for driving an LD 3 in accordance with a set bias current and a set modulation current.

A monitor PD section 4 is a circuit for receiving a portion of light emitted from the driven LD 3 and converting the optical signal into a voltage. The conversion of the light into a voltage may be carried out by using, for example, a PIN photodiode as a photoreceptor to convert an excitation current flowing through the PIN photodiode into a voltage.

A waveform detection section 5 is a circuit for detecting a fall state of the output signal from the monitor PD section 4. A detection process will be described later. The detection result from the waveform detection section 5 is input to a bias current setting section 6.

As aforementioned, by varying the bias current of the LD 3, a delay time in the optical output can be varied, and thereby the phase relation between the switching-off timing of the input signal and a relaxation oscillation of the optical output can be varied. The bias current setting section 6 is a circuit for setting the bias current of the LD 3 that the LD drive section 2 drives. In other words, the bias current setting section 6 serves as a means for varying the delay time in the optical output. The bias current setting section 6 sets the bias current of the LD 3 in accordance with the detection result from the waveform detection section 5.

Next, the operations will be explained. When a signal is input from the input section 1 to the LD drive section 2, the LD drive section 2 drives the LD3 starting with the bias current set by the bias current setting section 6. A modulation current is previously set. The LD 3 emits light that is compliant with the LD drive section 2. The emitted light from the LD 3 is guided to an optical fiber that serves as a sending medium, via an optical system not illustrated to be transmission light. A portion of the emitted light from the LD 3 is introduced to the monitor PD section 4.

The optical signal received by the monitor PD section 4 is converted into a voltage signal by means of a photoreceptor and a processing circuit contained in the monitor PD section 4. A band limitation is imposed on the voltage signal due to the frequency band of the conversion sections. For monitoring of a waveform of the received light, it is necessary for the band to have at least a comparable bandwidth to that of a circuit in a receiver that receives the optical communication signal.

Figure 6:
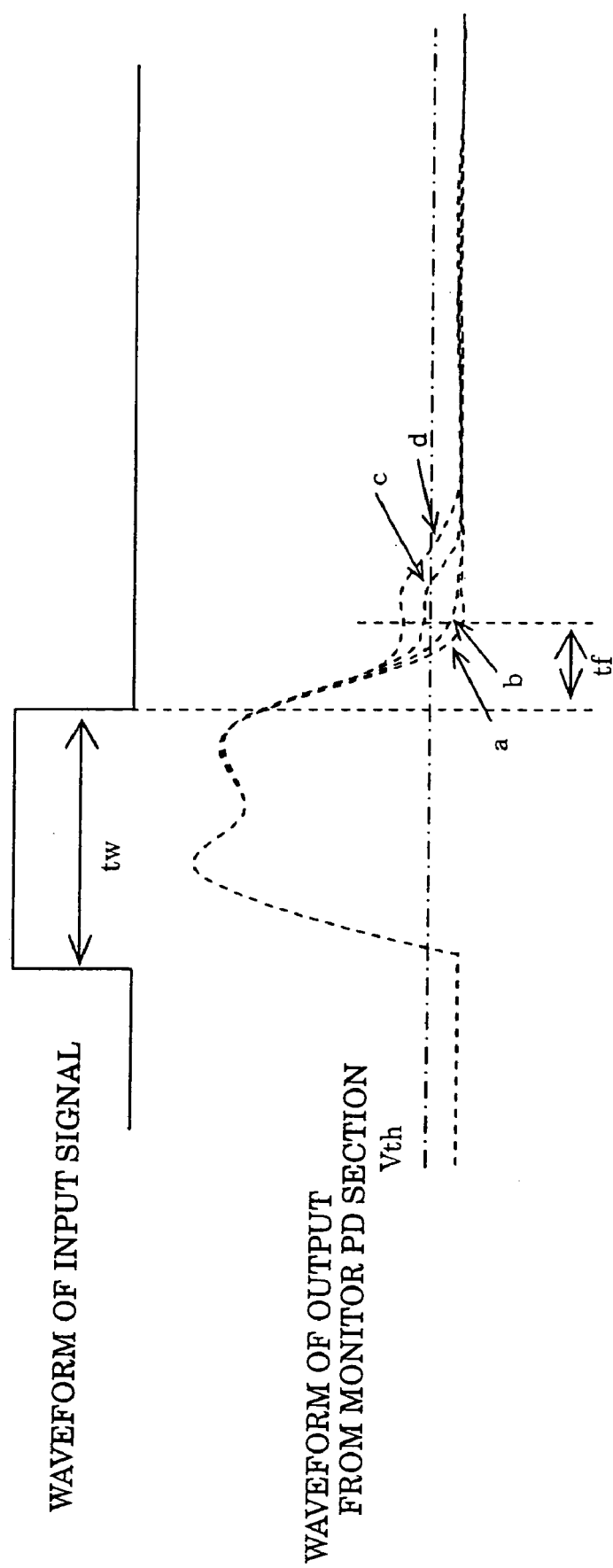
FIG. 6 is an explanatory view illustrating the phase relation between the switching-off timing of an input signal and the relaxation oscillation.

As mentioned above, a waveform of the voltage signal into which the optical signal is converted varies in accordance with the phase relation between the switching-off timing of the input signal and the relaxation oscillation. Varying waveforms at that time are shown in FIG. 6. Waveforms a to d in the figure correspond to the waveforms ① to ④ in the phase relation between the switching-off timing of the input signal and the relaxation oscillation. The waveforms a to d are more obtuse angled than the original optical Waveforms ① to ④ due to the band limitation imposed by the monitor PD section 4. The voltage signal is output from the monitor PD section 4 to the waveform detection section 5.

The waveform detection section 5 detects a fall state of the signal output from the monitor PD section 4, in a manner as follows for example: Referring to FIG. 6, when a predetermined reference input signal (pulse width: tw) is given, its voltage level is detected by an A/D converter or the like upon the lapse of the reference time tf after the switching off of the input signal. When the detected voltage level is not higher than a fixed reference voltage value Vth, the waveform detection section 5 regards the signal as having fallen within a predetermined time and outputs the detection result "OK". When the detected voltage exceeds the reference voltage value Vth, the waveform detection section 5 regards the signal as not having fallen within the predetermined time and outputs the detection result "NG". In FIG. 6, the waveforms a and b are "OK", while the waveforms c and d are "NG". The output from the waveform detection section 5 is input to the bias current setting section 6.

The bias current setting section 6 varies the set bias current of the LD 3 that the LD drive section 2 drives, in accordance with the result from the waveform detection section 5.

Figure 7:
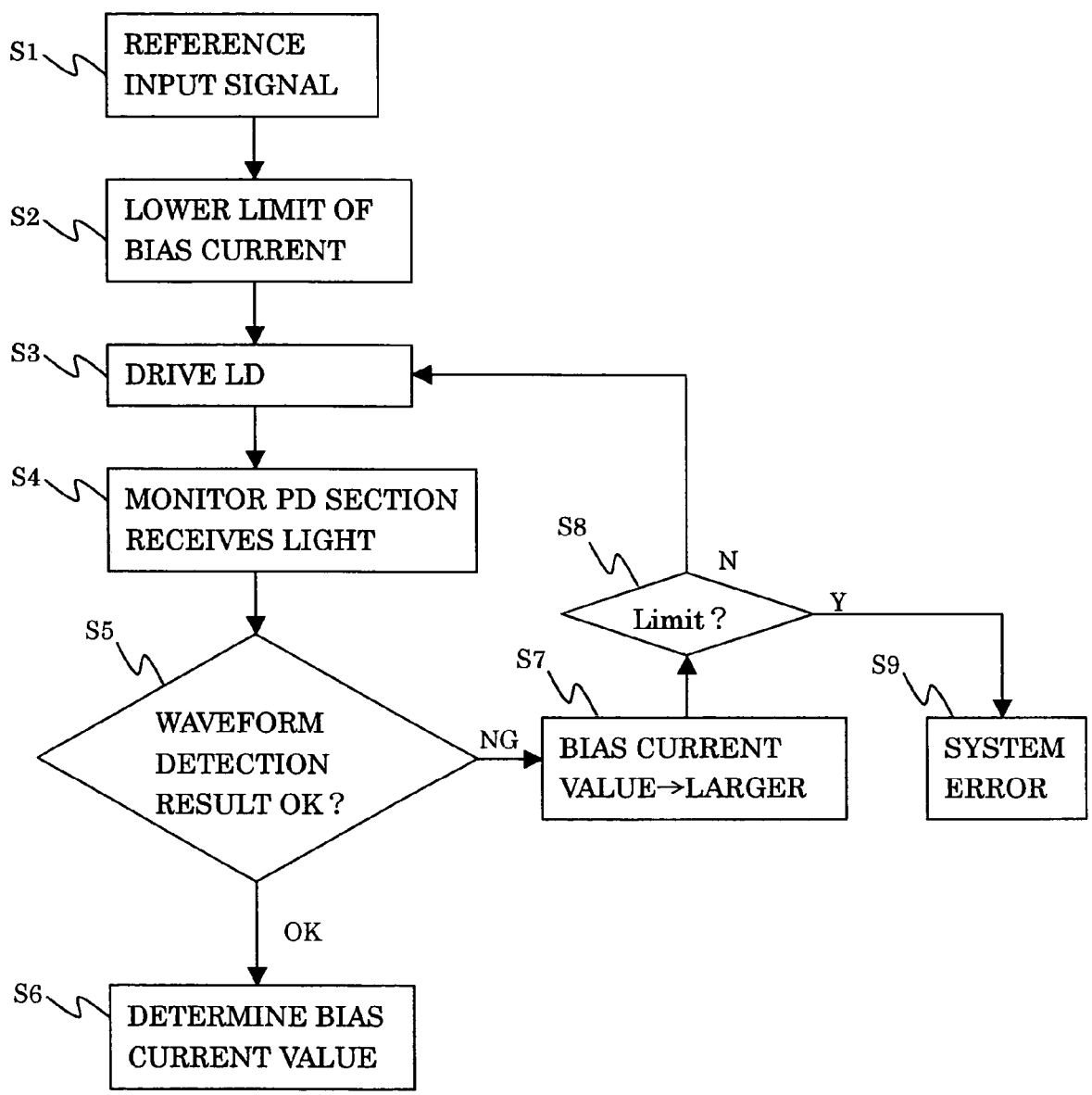
FIG. 7 is a flowchart illustrating a procedure for setting a bias current in Embodiment 1.

FIG. 7 is a flowchart illustrating a procedure for setting the bias current. First, the LD drive section 2 is supplied with a reference input signal (for example, a constant periodic repetitive pulse) for setting the bias current, and the LD drive section 2 drives the LD 3 at a lower limit of the bias current (Steps S1 to S3).

A portion of light emitted by the driven LD 3 is received by the monitor PD section 4 (Step S4). The output from the LD 3 is then converted into a voltage by the monitor PD section 4 and given to the waveform detection section 5. The waveform detection section 5 then detects a fall state of the output and judges whether the fall state is "OK" or "NG" (Step S5). If the waveform detection section 5 judges that it is "OK", the bias current value is determined (Step S6). If the waveform detection section 5 judges that it is "NG" in Step S5, the bias current setting section 6 sets the bias current at a value larger by a predetermined one (Step S7).

At this time, it is checked whether or not the value is an upper limit of the bias current (Step S8). If the value is not the upper limit, LD 3 is further driven at the set bias current value (Step S3). This continuous operation is repeated (Steps S3, S4, S5, S7 and S8) until a bias current value is determined. If it is judged in Step S8 that the bias current value is the upper limit, it is decided that a system error as a device failure has occurred (Step S9).

In the present embodiment, by setting the lower limit of the bias current in Step S2 and the upper limit of the bias current in Step S8 to be not higher than the oscillation threshold value, low power consumption in driving the LD3 can be achieved.

The setting of the bias current may be carried out either while a transmit/receive apparatus that contains the present optical transmission controller is in communication or while it is not. If the setting is carried out while it is in communication, a communication signal is used in place of the reference input signal. At this time, when the fall state does not reach a predetermined level within a predetermined time, there is a possibility that the communication error will occur, though communication can be restored once a bias current value is determined. Further, if it is judged that the system error has occurred (Step S9), a warning of it is given to the user by indicating it in a display section of a communication apparatus including the transmit/receive apparatus.

Figure 2:
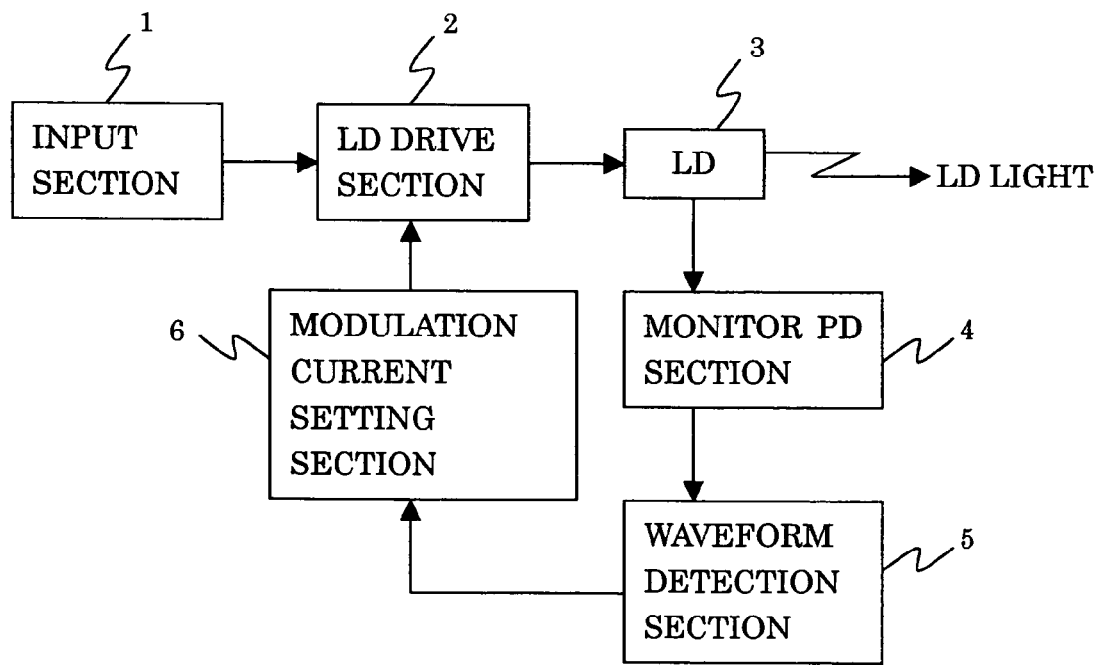
FIG. 2 is an explanatory view illustrating a construction of Embodiment 2 of the present invention.

Next, Embodiment 2 will be explained with reference to FIG. 2. In this embodiment, a modulation current setting means is employed as the phase relation adjustment means.

In the present embodiment, a modulation current setting section 7 is provided in place of the bias current setting section 6 of Embodiment 1. As aforementioned, by varying the modulation current of the LD 3, a frequency of the relaxation oscillation of the optical output can be varied, and thereby the phase relation between the switching-off timing of the input signal and the relaxation oscillation can be adjusted. The modulation current setting section 7 is a circuit for setting the modulation current of the LD 3 that the LD drive section 2 drives. In other words, the modulation current setting section 7 serves as a means for varying the frequency of the relaxation oscillation. The modulation current setting section 7 sets the modulation current in accordance with the detection result from the waveform detection section 5.

The operations will be explained. When a signal is input from the input section 1 to the LD drive section 2, the LD drive section 2 drives the LD 3 with the modulation current set by the modulation current setting section 7. The bias current is previously set. The LD 3 emits light that is compliant with the LD drive section 2. The emitted light from the LD 3 is guided to an optical fiber serving as a sending medium via an optical system not illustrated to be transmission light. A portion of the emitted light from the LD 3 is introduced to the monitor PD section 4. The optical signal received by the monitor PD section 4 is converted into a voltage signal by means of a photoreceptor and a processing circuit contained in the monitor PD section 4 and is output to the waveform detection section 5. The waveform detection section 5, as already mentioned, detects a fall state of the output signal from the monitor PD section 4 and outputs the result. The modulation current setting section 7 varies the set modulation current value of the LD 3 that the LD drive section 2 drives.

Figure 8:
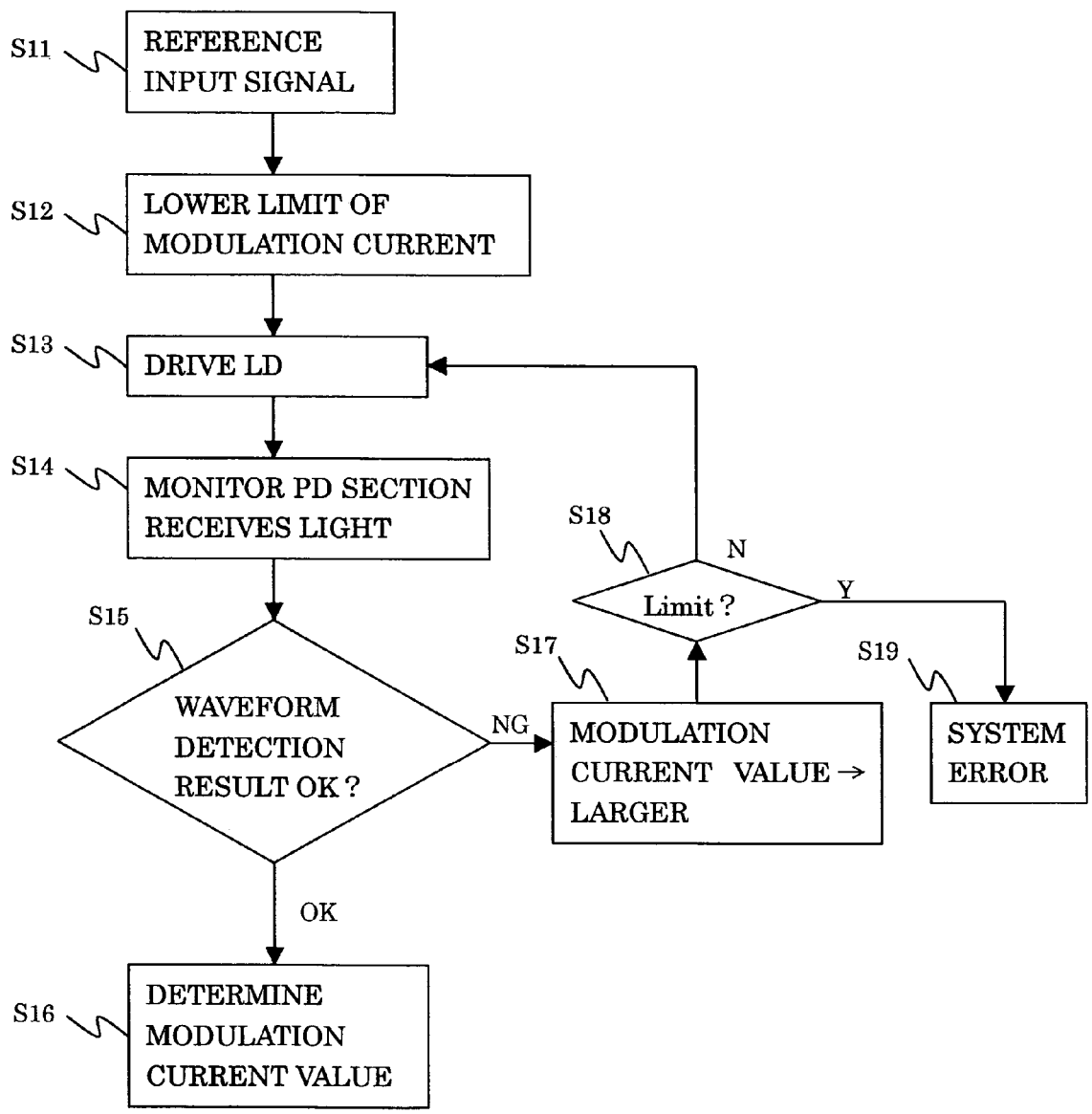
FIG. 8 is a flowchart illustrating a procedure for setting a modulation current in Embodiment 2.

FIG. 8 is a flowchart illustrating a procedure for setting the modulation current.

First, the LD drive section 2 is supplied with a reference input signal (for example, a constant periodic repetitive pulse) for setting the bias current, and the LD drive section 2 drives the LD 3 at a lower limit of the modulation current (Steps S11 to S13).

The bias current is previously set.

A portion of light emitted by the driven LD 3 is received by the monitor PD section 4 (Step S14). The output from the LD 3 is then converted into a voltage by the monitor PD section 4 and given to the waveform detection section 5. The waveform detection section 5 then detects a fall state of the output and judges whether the fall state is "OK" or "NG" (Step S15). If the waveform detection section 5 judges that it is "OK", the modulation current value is determined (Step S16). If the waveform detection section 5 judges that it is "NG" in Step S15, the modulation current setting section 6 sets the modulation current at a value larger by a predetermined one (Step S17).

At this time, it is checked whether or not the value is an upper limit of the modulation current (Step S18). If the value is not the upper limit, the LD 3 is further driven at the set modulation current value (Step S13). This continuous operation is repeated (Steps S13, S14, S15, S17 and S18) until a modulation value is determined. If it is judged in Step S18 that the modulation value is the upper limit, it is decided that a system error as a device failure has occurred (Step S19).

In the present embodiment, by setting the modulation current to be not higher than the oscillation threshold value, low power consumption in driving the LD3 can be achieved.

The setting of the modulation current may be carried out either while a transmit/receive apparatus that contains the present optical transmission controller is in communication or while it is not. If the setting is carried out while it is in communication, a communication signal is used in place of the reference input signal. At this time, when the fall state does not reach a predetermined level within a predetermined time, there is a possibility that the communication error will occur, though communication can be restored once a modulation current value is determined. Further, if it is judged that the system error has occurred (Step S19), a warning of it is given to the user by indicating it in a display section of a communication apparatus including the transmit/receive apparatus.

Figure 3:
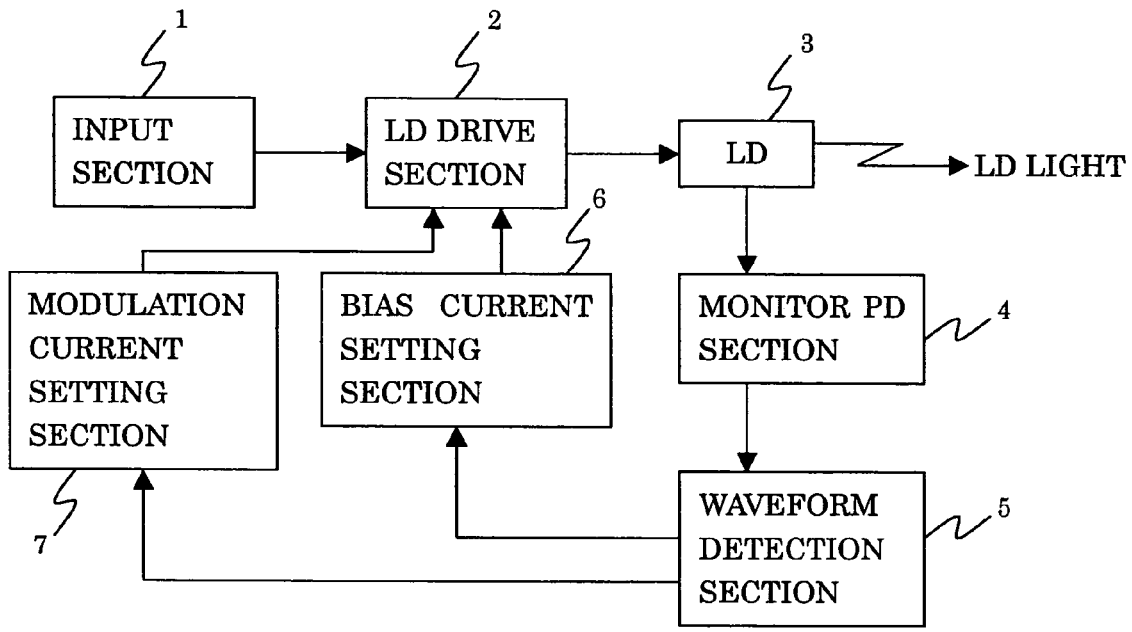
FIG. 3 is an explanatory view illustrating a construction of Embodiment 3 of the present invention.

Next, Embodiment 3 will be explained with reference to FIG. 3. In this embodiment, the bias current setting means and the modulation current setting means are employed as the phase relation adjustment means.

In one of the above two embodiments, the bias current has fixed upper and lower limits, while in the other, the modulation current has fixed upper and lower limits. Thus, in the above respective embodiments, the bias current setting section 6 or the modulation current setting section 7 can vary a set value only within a fixed range. There may be a case, however, where with either one of the setting sections used, it is judged that the system error has occurred, while with both the setting sections used, it is judged that a fall state is "OK". The present embodiment is intended to deal with this case.

In the present embodiment, the bias current setting section 6 of Embodiment 1 is used in combination with the modulation current setting section 7 of Embodiment 2.

The operations will be explained. When a signal is input from the input section 1 to the LD drive section 2, the LD drive section 2 drives the LD 3 with the bias current set by the bias current setting section 6 and with the modulation current set by the modulation current setting section 7. The LD 3 emits light that is compliant with the LD drive section 2. The emitted light from the LD 3 is guided to an optical fiber serving as a sending medium via an optical system not illustrated to be transmission light. A portion of the light from the LD 3 is introduced to the monitor PD section 4. The optical signal received by the monitor PD section 4 is converted into a voltage signal by means of a photoreceptor and a processing circuit contained in the monitor PD section 4 and is output to the waveform detection section 5. The waveform detection section 5, as already mentioned, detects a fall state of the output signal from the monitor PD section 4 and outputs the result. The bias current setting section 6 and the modulation current setting section 7 vary the set bias current value and the set modulation current value, respectively, in accordance with the detection result from the waveform detection section 5.

Figure 9:
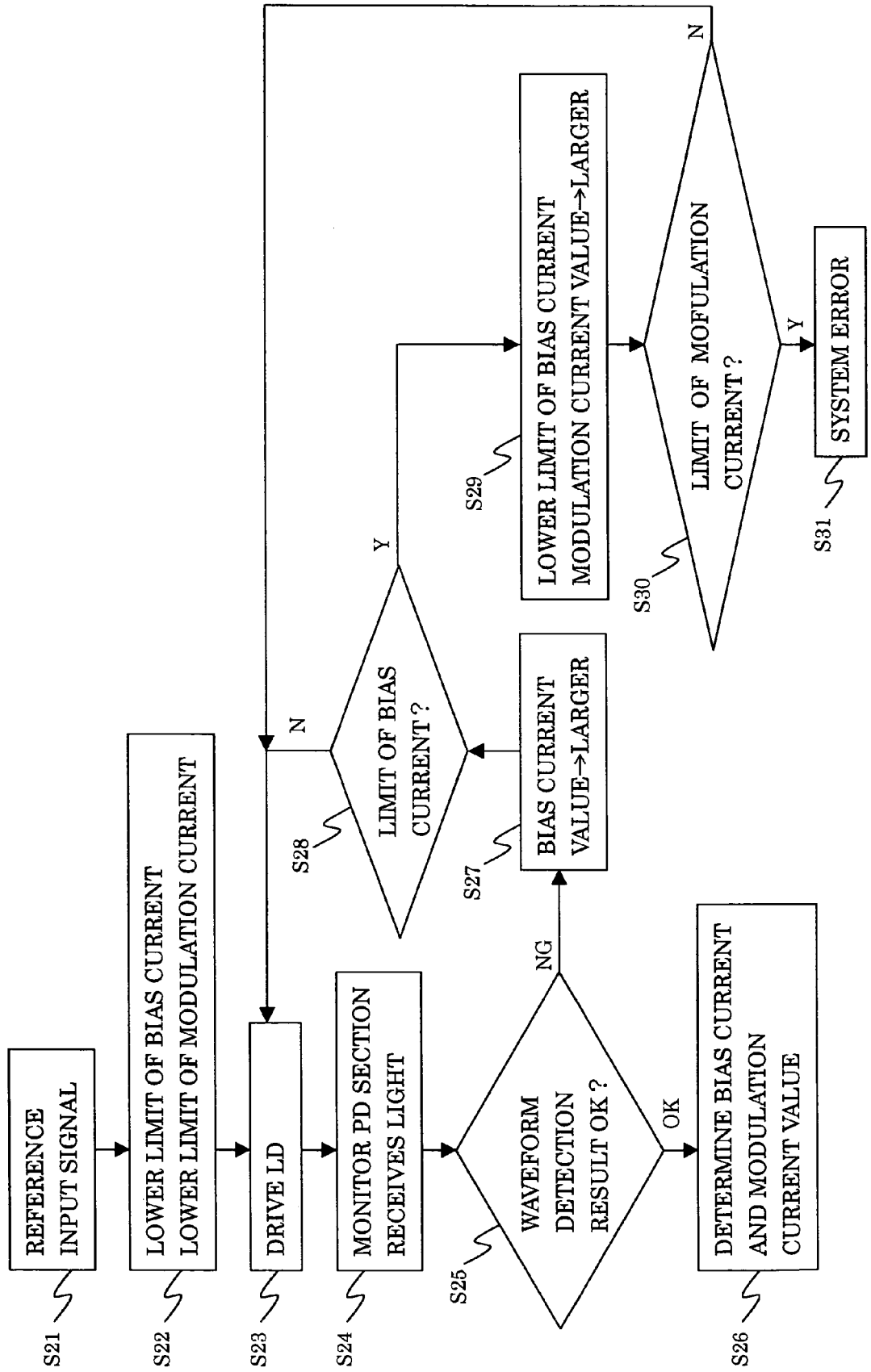
FIG. 9 is a flowchart illustrating a procedure for setting the bias current and the modulation current in Embodiment 3.

FIG. 9 is a flowchart illustrating a procedure for setting the bias current and the modulation current.

First, the LD drive section 2 is supplied with a reference input signal (for example, a constant periodic repetitive pulse) for setting the bias current value, and the LD drive section 2 drives the LD 3 at a lower limit of the bias current and a lower limit of the modulation current (Steps S21 to S23).

A portion of light emitted by the driven LD 3 is received by the monitor PD section 4 (Step S24). The output from the LD 3 is converted into a voltage by the monitor PD section 4 and given to the waveform detection section 5. The waveform detection section 5 then detects a fall state of the output and judges whether the fall state is "OK" or "NG" (Step S25). If the waveform detection section 5 judges that that it is "OK", the bias current value and the modulation current value are determined (Step S26). If the waveform detection section 5 judges that it is "NG" in Step S25, the bias current setting section 6 sets the bias current at a value larger by a predetermined one (Step S27).

At this time, it is checked whether or not the value is an upper limit of the bias current (Step S28). If the value is not the upper limit, LD 3 is further driven at the bias current value (Step S23). This continuous operation is repeated (Steps S23, S24, S25, S27 and S28) until a bias current value is determined. If it is judged in Step S28 that the bias current value is the upper limit, the bias current value is returned to the lower limit and the modulation current is set at a value larger by a predetermined one (Step S29).

At this time, it is checked whether or not the value is an upper limit of the modulation current (Step S30). If the value is not the upper limit, LD 3 is further driven at the bias current value (Step S23). This continuous operation is repeated (Steps S23, S24, S25, S27, S28, S29 and S30) until a modulation value is determined. If it is judged in Step S8 that the modulation current value is the upper limit, it is decided that a system error as a device failure has occurred (Step S31).

In the present embodiment, by setting the lower limit of the bias current in Step S22 and the upper limit of the bias current in Step S28 to be not higher than the oscillation threshold value, low power consumption in driving the LD3 can be achieved.

The setting of the bias current and the modulation current may be carried out either while a transmit/receive apparatus that contains the present optical transmission controller is in communication or while it is not. If the setting is carried out while it is in communication, a communication signal is used in place of the reference input signal. At this time, when the fall state does not reach a predetermined level within a predetermined time, there is a possibility that the communication error will occur, though communication can be restored once a bias current value and a modulation current value are determined. Further, if it is judged that the system error has occurred (Step S31), a warning of it is given to the user by indicating it in a display section of a communication apparatus including the present transmit/receive apparatus.

Next, Embodiment 4 will be explained. In this embodiment, an input signal control means is employed as the phase relation adjustment means.

In the present embodiment, in place of the bias current setting section 6 of Embodiment 1, an input signal control section 8 is provided between the input section 1 and the LD drive section 2. The input signal control section 8 is a circuit for adjusting the switching-off timing of the input signal. The input signal control section 8 is used for adjusting the phase relation between the switching-off timing of the input signal and the relaxation oscillation of the optical output.

An example of a method of varying the switching-off timing of an input signal will be explained with reference to FIGS. 10 to 12.

Figure 4:
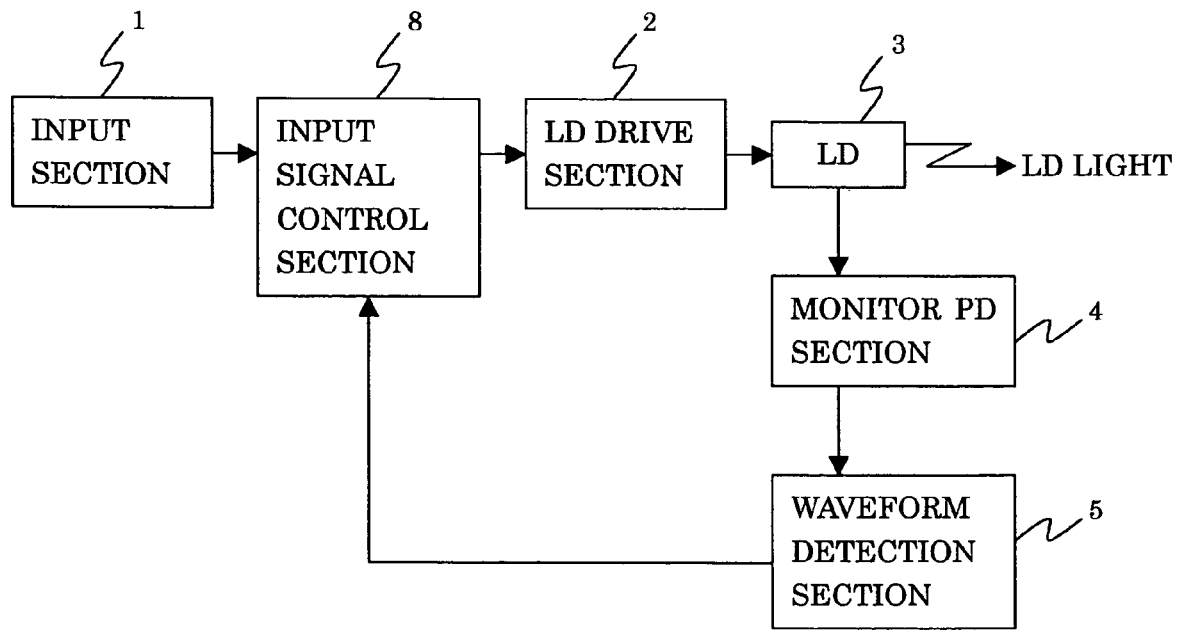
FIG. 4 is an explanatory view illustrating a construction of Embodiment 4 of the present invention.
Figure 5:
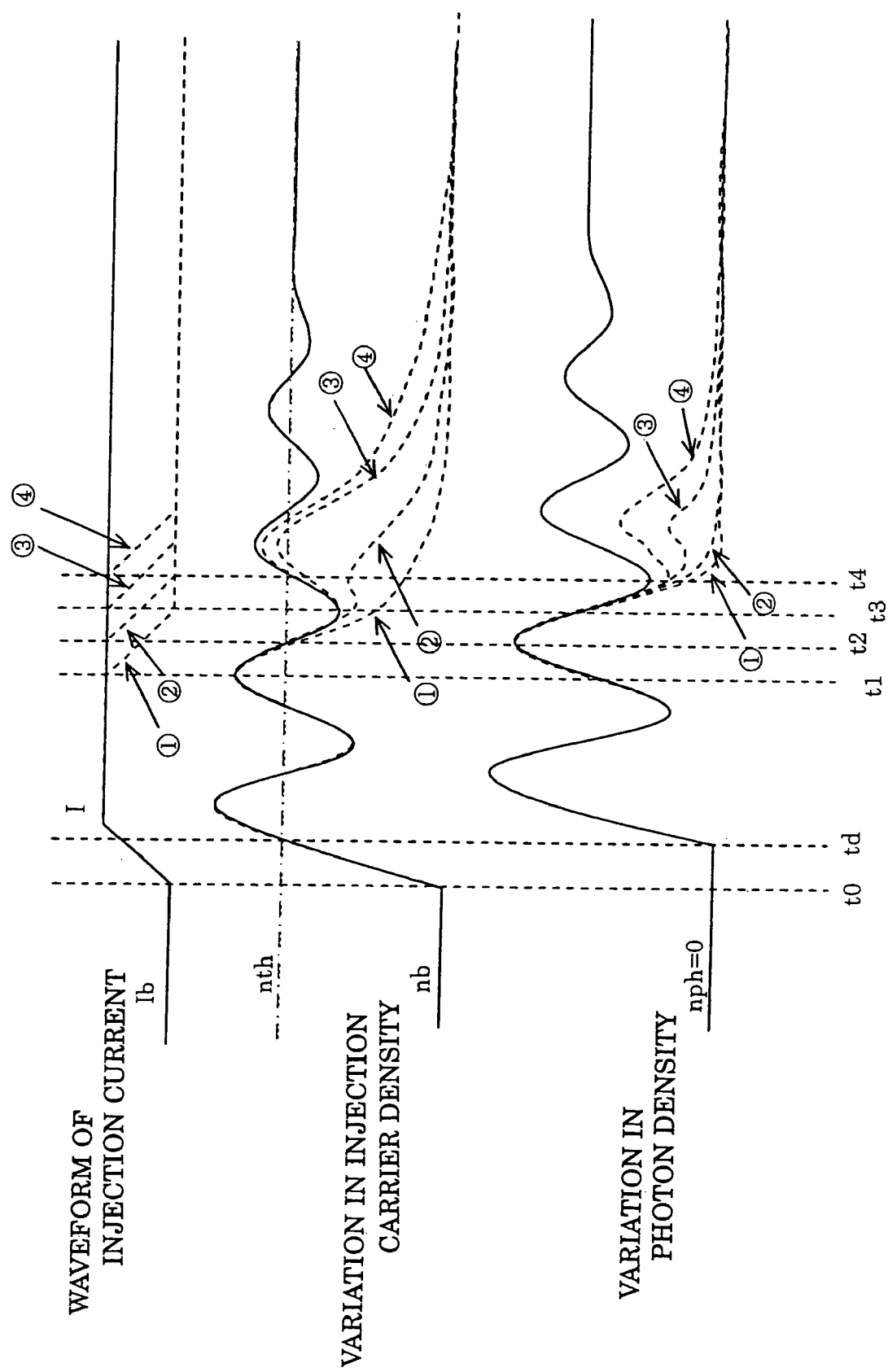
FIG. 5 is an explanatory view for a relaxation oscillation of an optical output.
Figure 10:
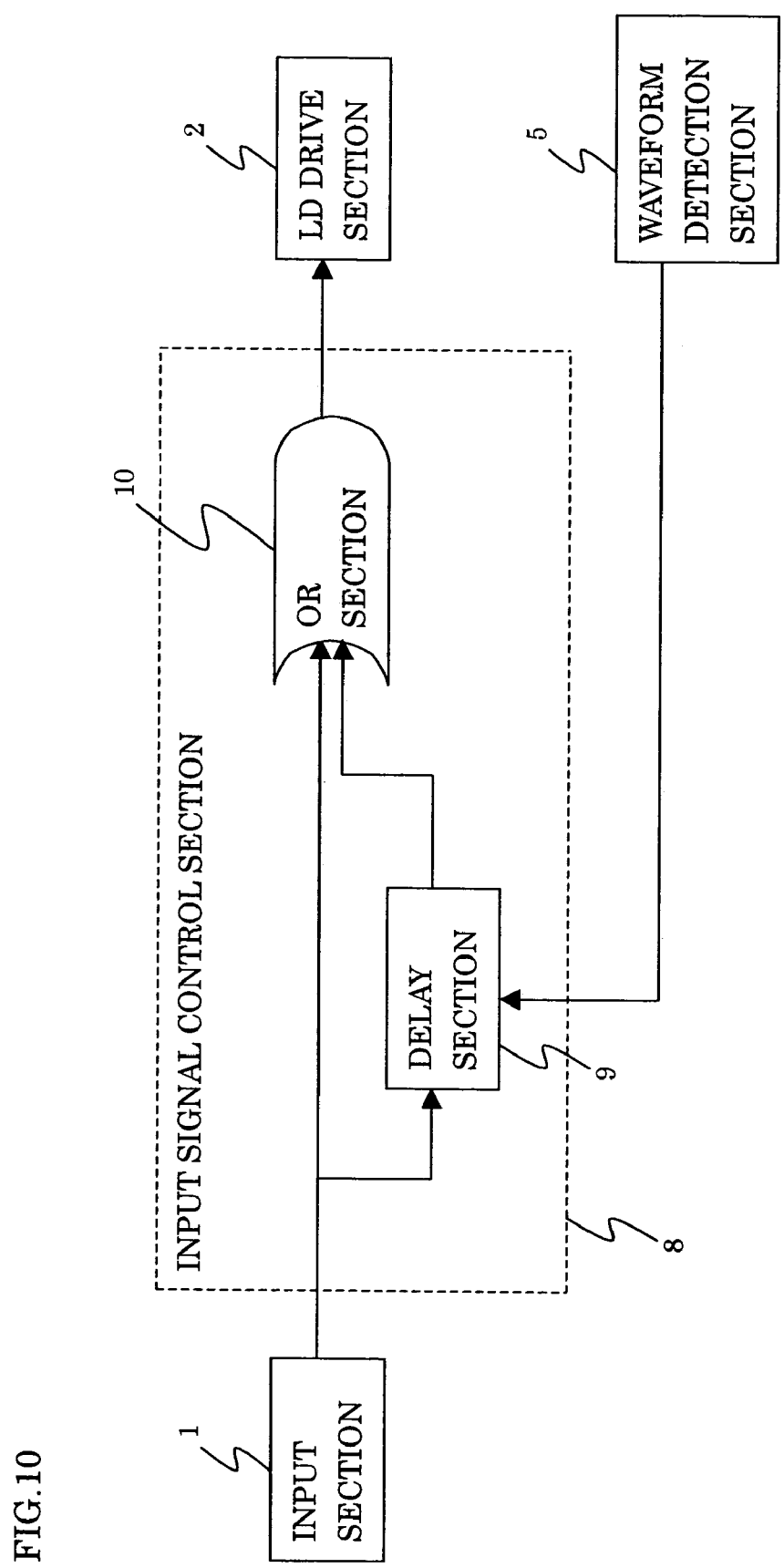
FIG. 10 is an explanatory view illustrating the details of an input signal control section of FIG. 4.

FIG. 10 is an explanatory view illustrating the details of the input signal control section 8 of FIG. 4. When it is input to the input signal control section 8, a signal from the input section 1 is broken into a signal which is to be directly input to an OR section 10 and a signal which is to be input via a delay section 9 to the OR section 10. The delay section 9 coverts the latter signal, in accordance with the signal from the waveform detection section 5, to a delay signal for providing a delay to the signal directly input to the OR section 10. The OR section 10 outputs a logic OR of the two signals, i.e., the signal directly input to the OR section 10 and the delay signal.

Figure 11:
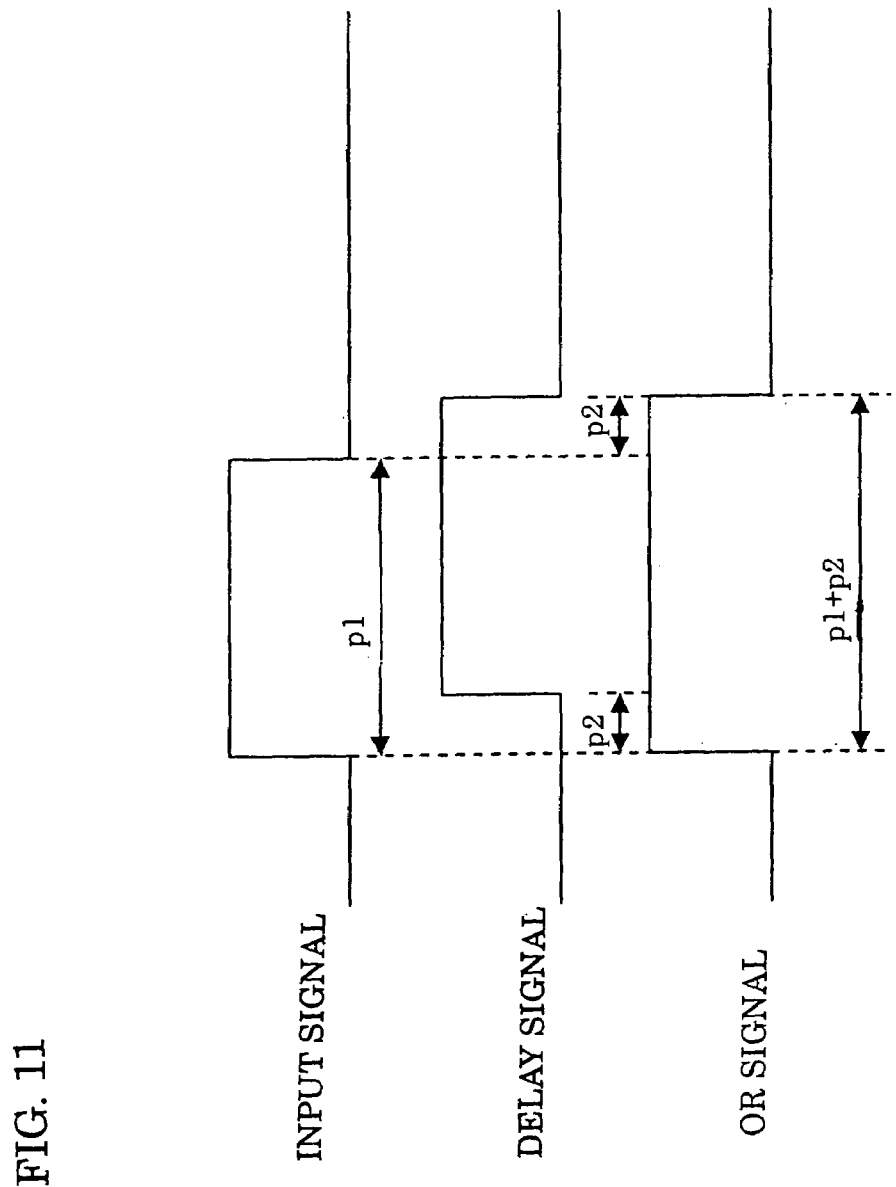
FIG. 11 is a time chart for explaining a delay in the switching-off timing of an input signal in Embodiment 4.

Referring to a time chart of FIG. 11, the delay signal derived from the input signal (pulse width: p1) supplied to the input signal control section 8 provides a delay p2. The delay signal is output to the OR section 10. The OR section 10 outputs the OR signal as the logic OR of the two signals, i.e., the signal directly input to the OR section 10 and the delay signal. The OR signal has a pulse width p1+p2. Namely, the OR signal is a signal of which the switching-off timing is varied by the delay p2 from the original input signal. By constituting the delay section 9 so that the delay p2 is variable, the switching-off timing of the input signal can be varied. A delay element that can provide a variable delay is already known as a programmable signal delay IC, and controlling the delay element can easily allow the switching-off timing of the input signal to be varied.

In accordance with the detection result of the waveform detection section 5, the input signal control section 8 inputs, to the LD drive section 2, a signal of which the switching-off timing is varied.

Figure 12:
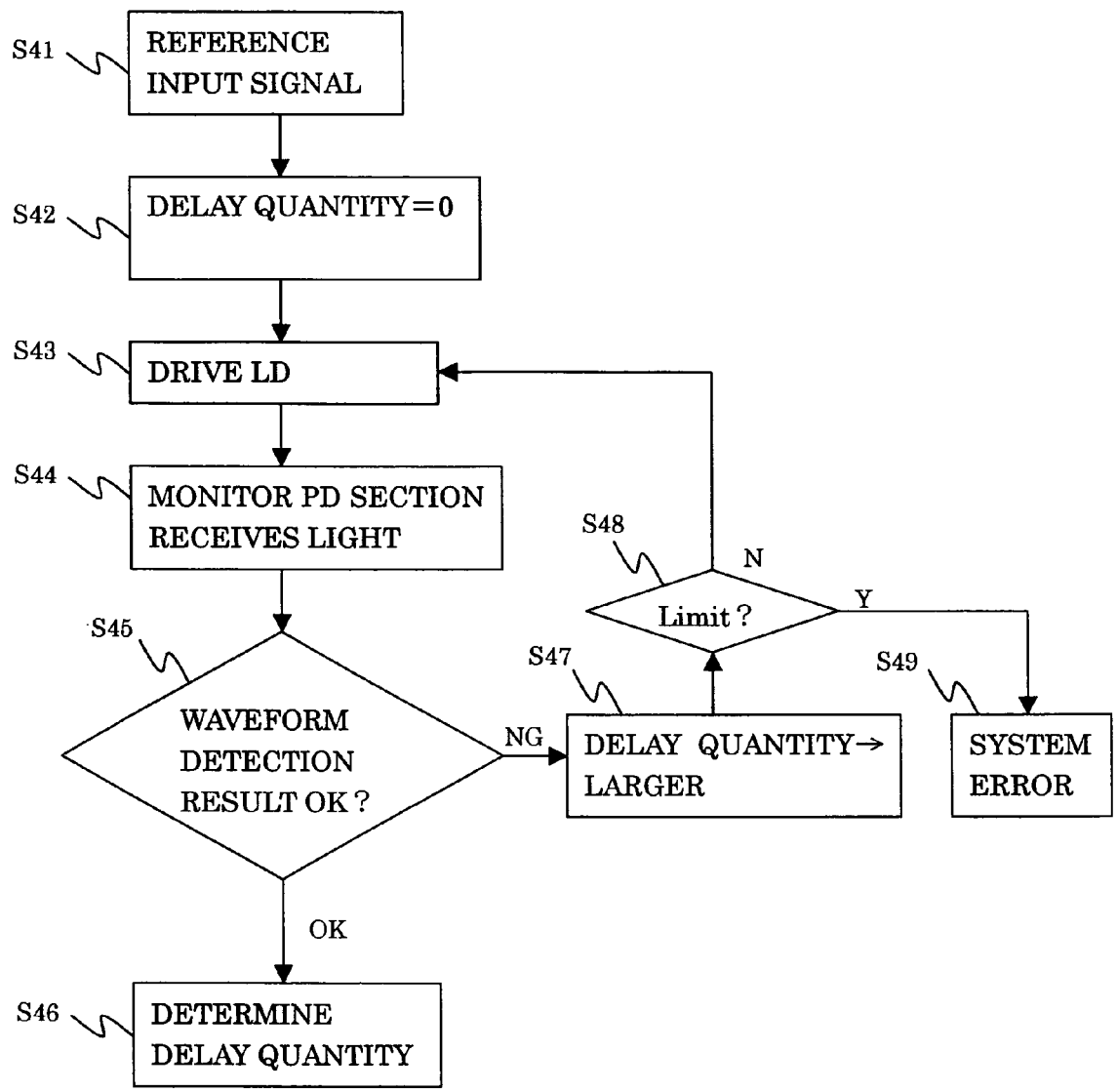
FIG. 12 is a flowchart illustrating a procedure for varying the switching-off timing of an input signal by means of the input signal control section.

FIG. 12 is a flowchart illustrating a procedure for varying the switching-off timing of the input signal by means of the input signal control section 8.

First, a reference input signal for adjusting the switching-off timing of the input signal (for example, a constant periodic repetitive pulse) is supplied, and thereby the LD 3 is driven with a delay quantity=0 (Steps S41 to S43). The bias current and the modulation current are previously set.

A portion of light emitted by the driven LD 3 is received by the monitor PD section 4 (Step S44). The output from the LD 3 is then converted into a voltage by the monitor PD section 4 and given to the waveform detection section 5. The waveform detection section 5 then detects a fall state of the output and judges whether the fall state is "OK" or "NG" (Step S45). If the waveform detection section 5 judges that it is "OK", the delay quantity is determined (Step S46). If the waveform detection section 5 judges that it is "NG" in Step S45, the input signal control section 8 sets the delay at a quantity larger by a predetermined one (Step S47).

At this time, it is checked whether or not the quantity is an upper limit of the delay (Step S48). If the set delay quantity is not the upper limit, LD 3 is further driven at the set delay quantity (Step S43) and this continuous operation is repeated (Steps S43, S44, S45, S47 and S48) until a delay quantity is determined. If it is judged in Step S48 that the delay quantity is the upper limit, it is decided that a system error as a device failure has occurred (Step S49).

In the present embodiment, by setting the lower limit of the bias current to be not higher than the oscillation threshold value, low power consumption in driving the LD3 can be achieved.

The setting of the delay may be carried out either while a transmit/receive apparatus that contains the present optical transmission controller is in communication or while it is not. If the setting is carried out while it is in communication, a communication signal is input in place of the reference input signal. At this time, when the fall state does not reach a predetermined level within a predetermined time, there is a possibility that the communication error will occur, though communication can be restored once a delay quantity is determined. Further, when it is judged that the system error has occurred (Step S49), a warning of it is given to the user by indicating it in a display section of a communication apparatus including the transmit/receive apparatus.

In the above-mentioned embodiments, the bias current, modulation current and delay may have any respective upper and lower limits as long as the phase relation between the switching-off timing of the input signal and the relaxation oscillation of the optical output of the LD 3 is adjusted. The switching-off timing of the input signal is adjusted within one period of the relaxation oscillation. The respective upper and lower limits of the bias current, modulation current and delay are set so that the phase relation between the relaxation oscillation of the optical output from the LD 3 and the switching-off timing of the input signal is adjusted within one period of the relaxation oscillation.

It is expected that a pulse width of light to be output, an extinction ratio and a peak power will change by varying the respective upper and lower limits of the bias current, modulation current and delay. Desirably, the respective upper and lower limits of the bias current, modulation current and delay are set so that the pulse width of light to be output, extinction ratio and peak power can satisfy communication standards to be used (within permissible ranges of pulse width distortion, extinction ratio, optical output and the like) even after their changing.

The above-mentioned reference input signal may be of one kind or of a plurality of kinds.

According to the present invention, for the high-speed drive of the semiconductor laser starting with a value not higher than the oscillation threshold value for reduction in consumption power, the relaxation oscillation of the fall portion of the waveform of the optical output is reduced by adjusting the phase relation between the switching-off timing of the input signal and the relaxation oscillation of the optical output. This serves to suppress the transient oscillation of the fall portion of the waveform of the optical output, thereby preventing deterioration in quality of communication that uses the optical signal.

According to the present invention, in the optical transmission that uses the semiconductor laser, the optical signal output is controlled so as to reduce the relaxation oscillation of the fall portion of the waveform of the optical signal output. This makes it possible to shorten the fall time of the optical signal output, to ensure an Eye Opening and to obtain excellent quality in optical signal, thereby providing stable communication. Further, with the semiconductor laser driven starting with a value not higher than the oscillation threshold value, the present optical transmission controller can achieve low power consumption, thereby making it possible to simplify a heat-dissipation design.

What is claimed is:

1. An optical transmission controller comprising:
   a semiconductor laser;
   a semiconductor laser drive section for allowing the semiconductor laser to output an optical signal;
   a monitor photoreceptor for monitoring the optical signal output from the semiconductor laser;
   a waveform detection means for detecting a fall state of a waveform of the optical signal output monitored by the monitor photoreceptor; and
   a phase relation adjustment means for adjusting a phase relation between a fall timing of an input current fed to the semiconductor laser and a variation timing of a relaxation oscillation of the waveform of the optical signal output in accordance with a detection result of the waveform detection means to reduce the relaxation oscillation of a fall portion of the waveform of the optical signal output.

2. The optical transmission controller of claim 1, wherein the phase relation adjustment means comprises a bias current setting means for adjusting a bias current of the semiconductor laser within a range between values smaller than an oscillation threshold value to vary a delay time in the optical signal output against the input current and thereby to vary a phase of the relaxation oscillation of the waveform of the optical signal output with respect to the fall timing of the input current.

3. The optical transmission controller of claim 1, wherein the phase relation adjustment means comprises a modulation current setting means for adjusting the input current of the semiconductor laser to vary a frequency of the relaxation oscillation of the waveform of the optical signal output and thereby to vary a phase of the relaxation oscillation of the waveform of the optical signal output with respect to the fall timing of the input current.

4. The optical transmission controller of claim 2, wherein the phase relation adjustment means further comprises a modulation current setting means as defined in claim 3.

5. The optical transmission controller of claim 2 or 4, wherein the variation in the delay time, caused by the bias current setting means adjusting the bias current of the semiconductor, is within one period of the relaxation oscillation of the optical signal output.

6. The optical transmission controller of claim 1, wherein the phase relation adjustment means comprises an input signal control means for adjusting a switching-off timing of the input current to vary the fall timing of the input current with respect to a phase of the relaxation oscillation of the waveform of the optical signal output.

7. The optical transmission controller of claim 6, wherein the variation in the delay time, caused by the input signal control means adjusting the switching-off timing of the input current, is within one period of the relaxation oscillation of the optical signal output.

8. The optical transmission controller of claim 3 or 6, wherein a value of the bias current is set to be lower than an oscillation threshold value of the semiconductor laser.

* * * * *